US010697337B2

(12) United States Patent
Pursifull (10) Patent No.: US 10,697,337 B2
(45) Date of Patent: Jun. 30, 2020

(54) FILTER DIAGNOSTICS AND PROGNOSTICS

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 15/804,425

(22) Filed: Nov. 6, 2017

(65) Prior Publication Data

US 2018/0058280 A1    Mar. 1, 2018

Related U.S. Application Data

(62) Division of application No. 14/598,385, filed on Jan. 16, 2015, now Pat. No. 9,874,124.

(51) Int. Cl.

| F01M 1/10 | (2006.01) |
|---|---|
| F01M 11/10 | (2006.01) |
| B01D 35/143 | (2006.01) |
| B01D 35/147 | (2006.01) |
| F01M 1/16 | (2006.01) |

(52) U.S. Cl.
CPC ........... *F01M 11/10* (2013.01); *B01D 35/143* (2013.01); *B01D 35/147* (2013.01); *B01D 35/1435* (2013.01); *B01D 35/1475* (2013.01); *F01M 1/16* (2013.01); *F01M 2001/1092* (2013.01); *F16N 2250/04* (2013.01)

(58) Field of Classification Search
CPC .. F01M 1/10; F01M 1/16; F01M 1/18; F01M 11/10; F01M 2001/1092; F16N 2250/04; B01D 35/14; B01D 35/143; B01D 35/1435; B01D 35/1475; B01D 35/147

USPC ................... 210/90, 741; 123/196 A, 196 S
See application file for complete search history.

(56) References Cited

U.S. PATENT DOCUMENTS

| 3,485,324 A | 12/1969 | Novak |
| 3,644,915 A | 2/1972 | McBurnett |
| 5,968,371 A | 10/1999 | Verdegan et al. |
| 6,334,950 B1 | 1/2002 | Bogacki et al. |
| 6,504,474 B1 | 1/2003 | Goodnight et al. |
| 6,553,290 B1 | 4/2003 | Pillar |
| 7,712,441 B2 | 5/2010 | Cinpinski et al. |
| 7,819,093 B2 | 10/2010 | Yamashita et al. |

(Continued)

FOREIGN PATENT DOCUMENTS

| CN | 1879933 A | 12/2006 |
| CN | 102678224 A | 9/2012 |

(Continued)

OTHER PUBLICATIONS

State Intellectual Property Office of the People's Republic of China, Office Action and Search Report Issued in Application No. 201610028774.4, dated Feb. 2, 2019, 12 pages. (Submitted with Partial Translation).

*Primary Examiner* — Matthew O Savage
(74) *Attorney, Agent, or Firm* — Geoffrey Brumbaugh McCoy Russell LLP (57) ABSTRACT

Various systems and methods are provided for a lubricant filter. In one example, a method for a lubricant filter comprises indicating a condition of the filter based on a difference between a measured pressure differential and an expected pressure differential during select conditions in which all lubricant pumped by a pump upstream of the filter flows into the filter.

5 Claims, 6 Drawing Sheets

(56) References Cited

U.S. PATENT DOCUMENTS

| | | |
|---|---|---|
| 8,109,138 B2 | 2/2012 | Han et al. |
| 8,695,411 B2 | 4/2014 | Okazawa et al. |
| 2002/0172604 A1 | 11/2002 | Berger |
| 2003/0226809 A1 | 12/2003 | Zagone et al. |
| 2008/0230317 A1 | 9/2008 | Jen |
| 2011/0209682 A1 | 9/2011 | Storch et al. |
| 2012/0074069 A1 | 3/2012 | Ripley et al. |
| 2012/0148382 A1 | 6/2012 | Kruger et al. |
| 2013/0343937 A1 | 12/2013 | Williamson et al. |

FOREIGN PATENT DOCUMENTS

| | | |
|---|---|---|
| CN | 103089389 A | 5/2013 |
| DE | 3519026 A1 | 4/1986 |
| WO | 02103170 A1 | 12/2002 |

FILTER DIAGNOSTICS AND PROGNOSTICS

CROSS REFERENCE TO RELATED APPLICATION

The present application is a divisional of U.S. patent application Ser. No. 14/598,385, entitled "FILTER DIAGNOSTICS AND PROGNOSTICS," filed on Jan. 16, 2015. The entire contents of the above-referenced application are hereby incorporated by reference in its entirety for all purposes.

FIELD

The field of the disclosure relates to lubricant filters.

BACKGROUND AND SUMMARY

Lubrication systems are used in internal combustion engines to lubricate and reduce friction within moving components in the engine, thereby increasing the operational life of the components and the engine. For example, pistons, crankshafts, bearings, etc., may be lubricated with oil by a lubrication circuit provided in an engine. The lubrication circuit may include a filter configured to reduce particulates from lubricant that may otherwise interfere with component lubrication. As the filter ages, particulates accumulate therein, eventually reaching a prevalence at which replacement of the filter is recommended.

U.S. Pat. No. 6,553,290 discloses methods of identifying clogging in a lubricant or fluid filter. Specifically, clogging in an engine oil filter is detected by measuring the pressure drop across the filter.

The inventors herein have recognized an issue with the approach identified above. Typical oil circuits provide one or more bypass or pressure relief valves that enable oil to bypass an oil filter at or above a threshold oil pressure. During conditions in which one or more of these valves are open, at least a portion of oil flowing through an oil circuit bypasses the filter. As such, pressure drops across the filter measured during these conditions are not fully indicative of filter clogging. Use of filter pressure drops during these conditions may lead to inaccurate identification of filter clogging, which may prompt unnecessary replacement of the filter.

One approach that at least partially addresses the above issues includes a method for a lubricant filter comprising indicating a condition of the filter based on a difference between a measured pressure differential and an expected pressure differential during select conditions in which all lubricant pumped by a pump upstream of the filter flows into the filter.

In a more specific example, the condition is one of a nominal condition and a degraded condition In another example, the expected pressure differential is determined as a product of a lubricant flow rate and a lubricant viscosity.

In yet another example, the lubricant filter is configured to filter lubricant in a lubrication circuit including the pump, a filter bypass valve, and a pressure relief valve, and during the select conditions an outlet pressure of the pump is limited to less than one or both of respective setpoints of the filter bypass valve and the pressure relief valve.

In this way, pressure differentials across a lubricant filter may be accurately correlated to nominal or degraded filter conditions, which may reduce excessively early filter replacement, in turn reducing costs and hazardous waste issues associated with filter replacement. Thus, the technical result is achieved by these actions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Finally, the above explanation does not admit any of the information or problems were well known.

DETAILED DESCRIPTION

Figure 1:
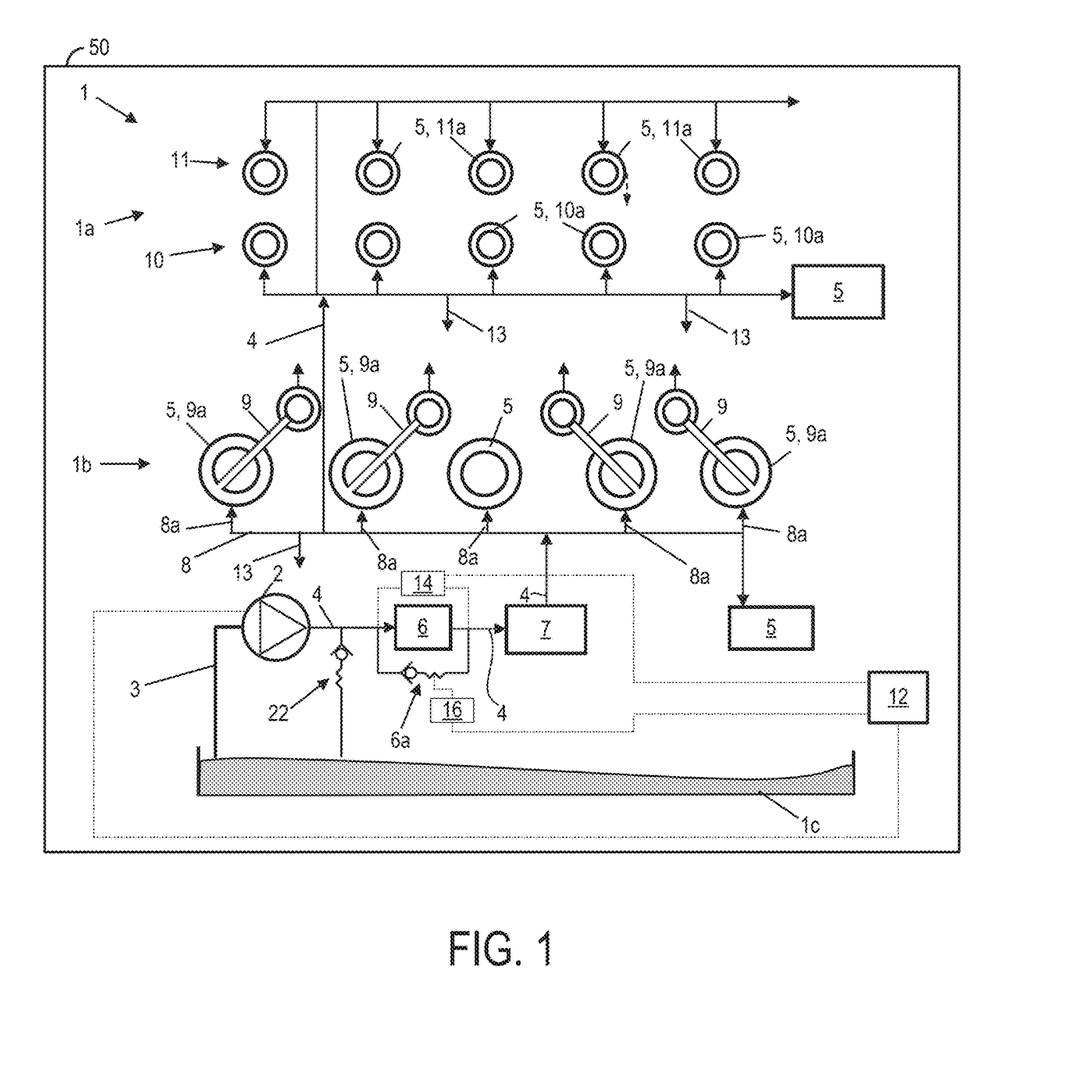
FIG. 1 shows an example oil circuit of an internal combustion engine.
Figure 2:
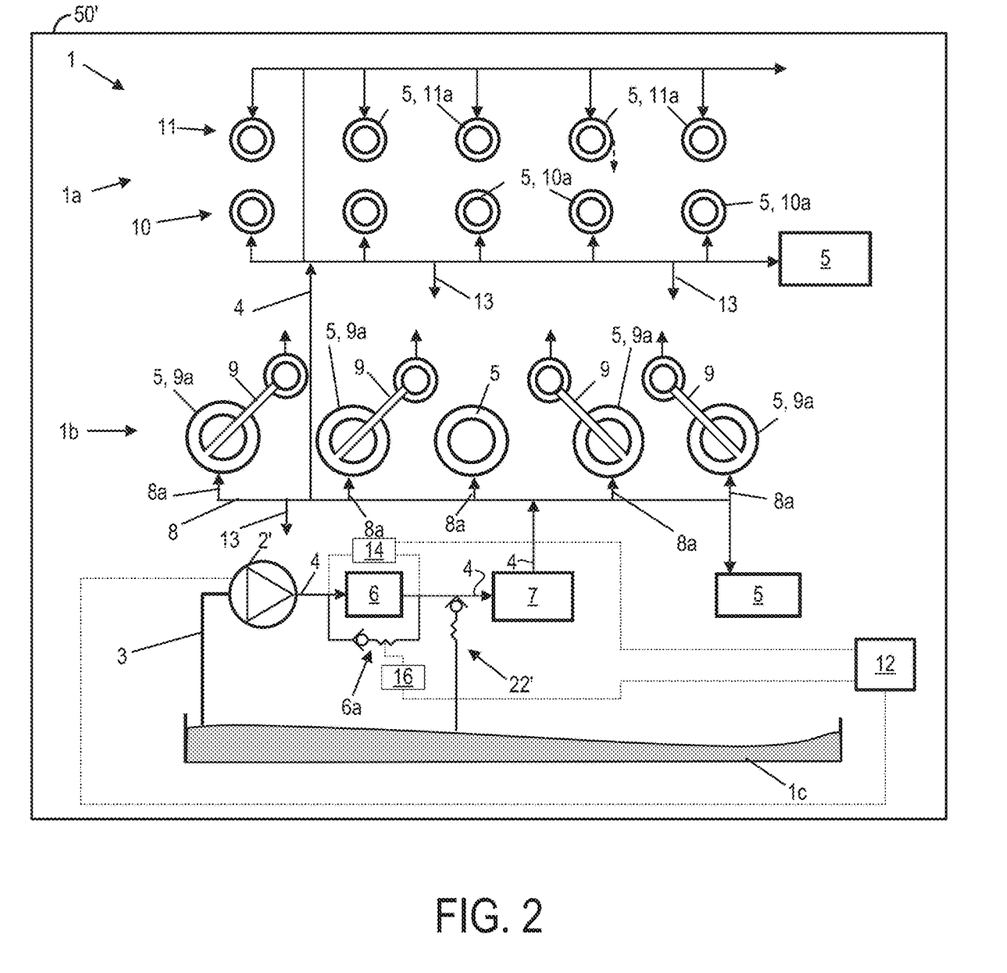
FIG. 2 shows another example oil circuit of an internal combustion engine.
Figure 3:
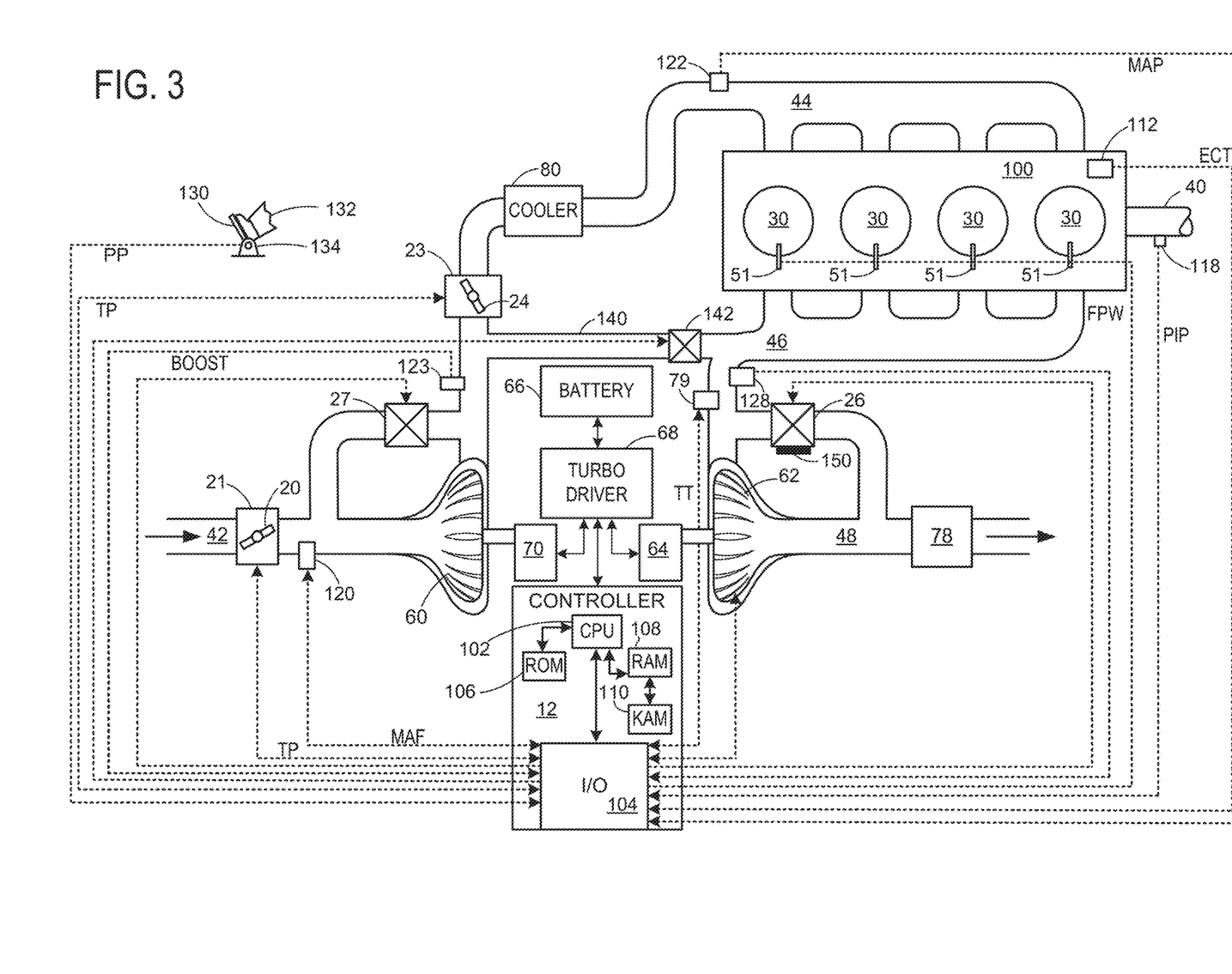
FIG. 3 is a schematic diagram showing an example engine.
Figure 4A:
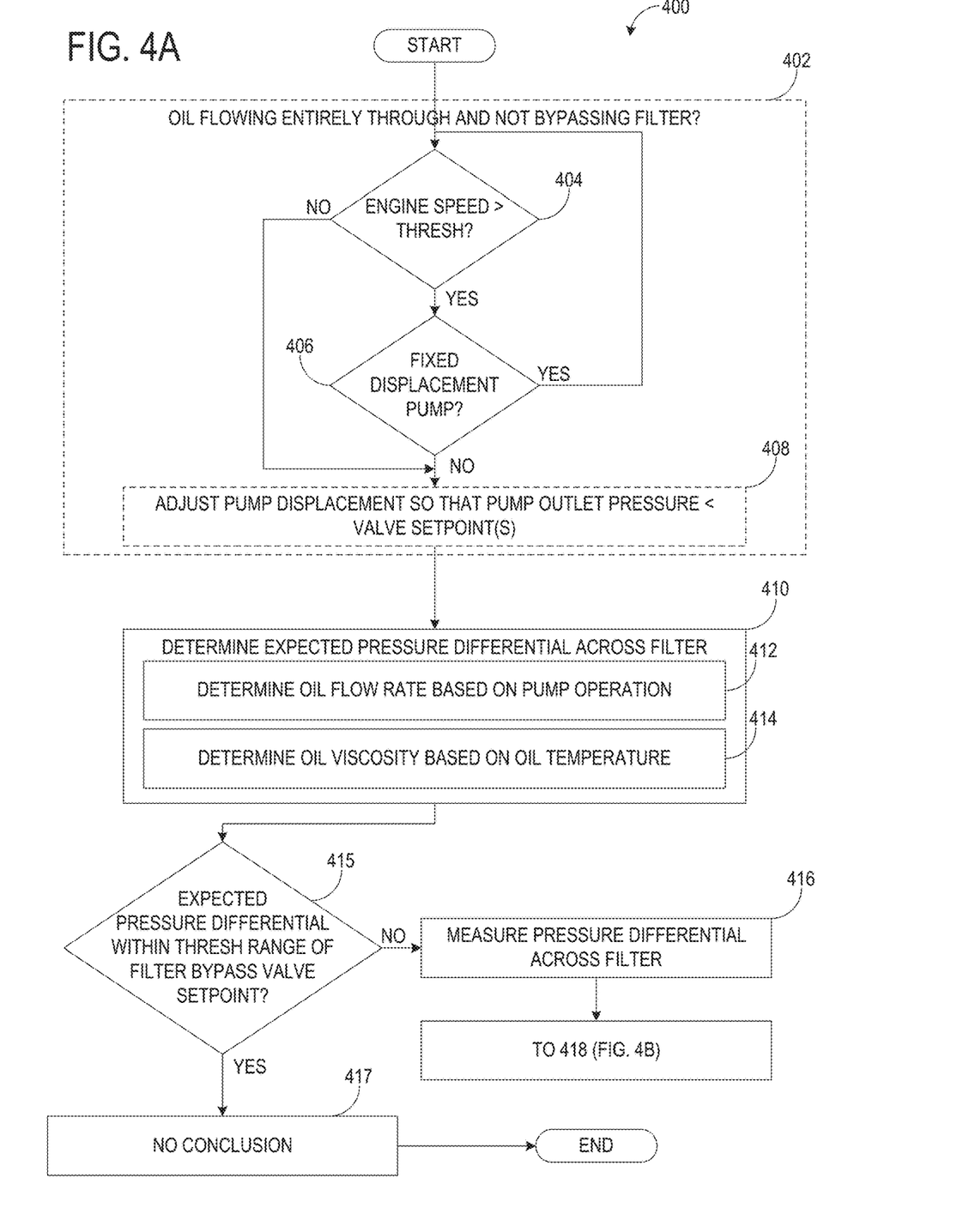
FIGS. 4A-B show a flowchart illustrating a diagnostic routine for a filter in an oil circuit.
Figure 4B:
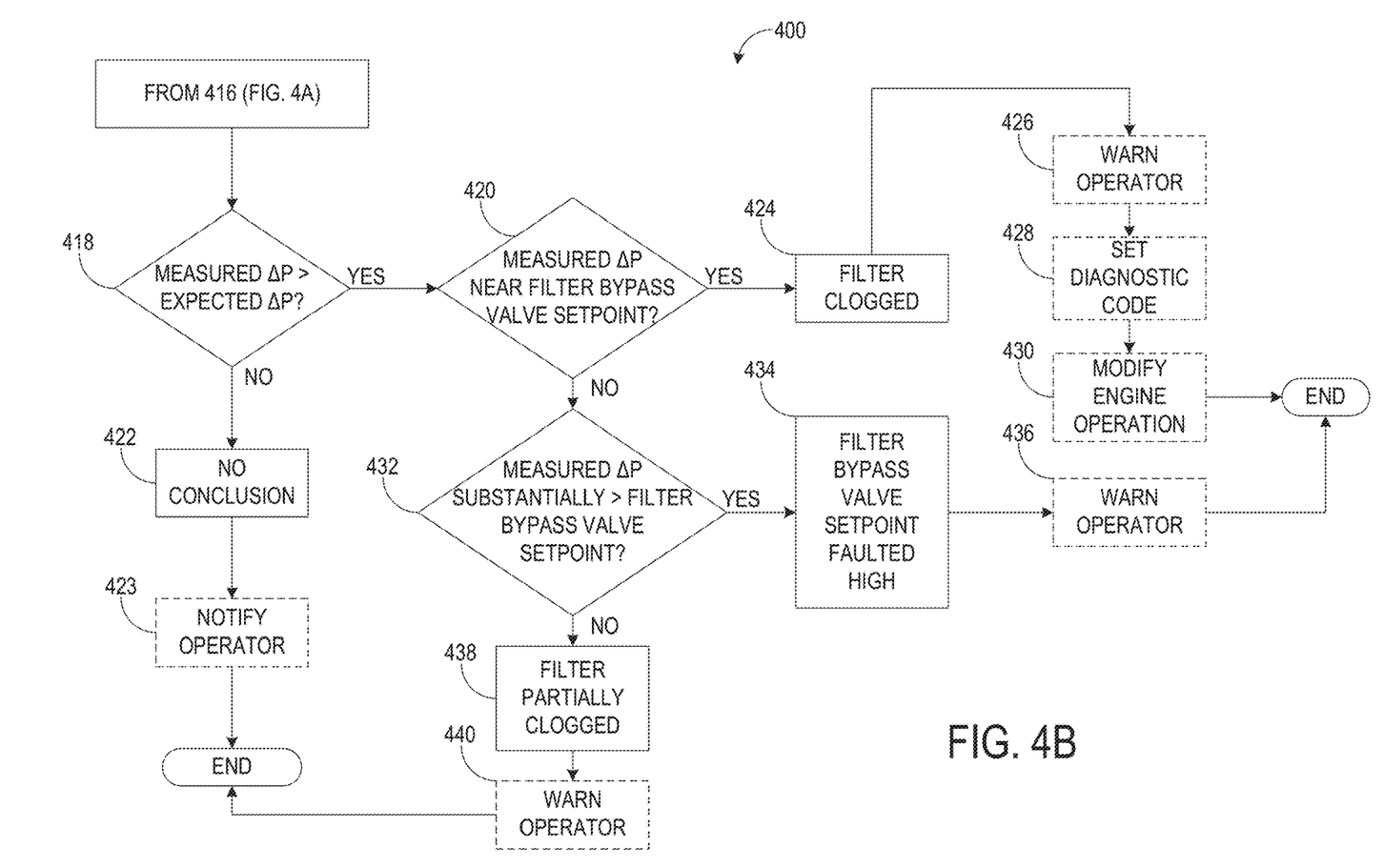
Figure 5:
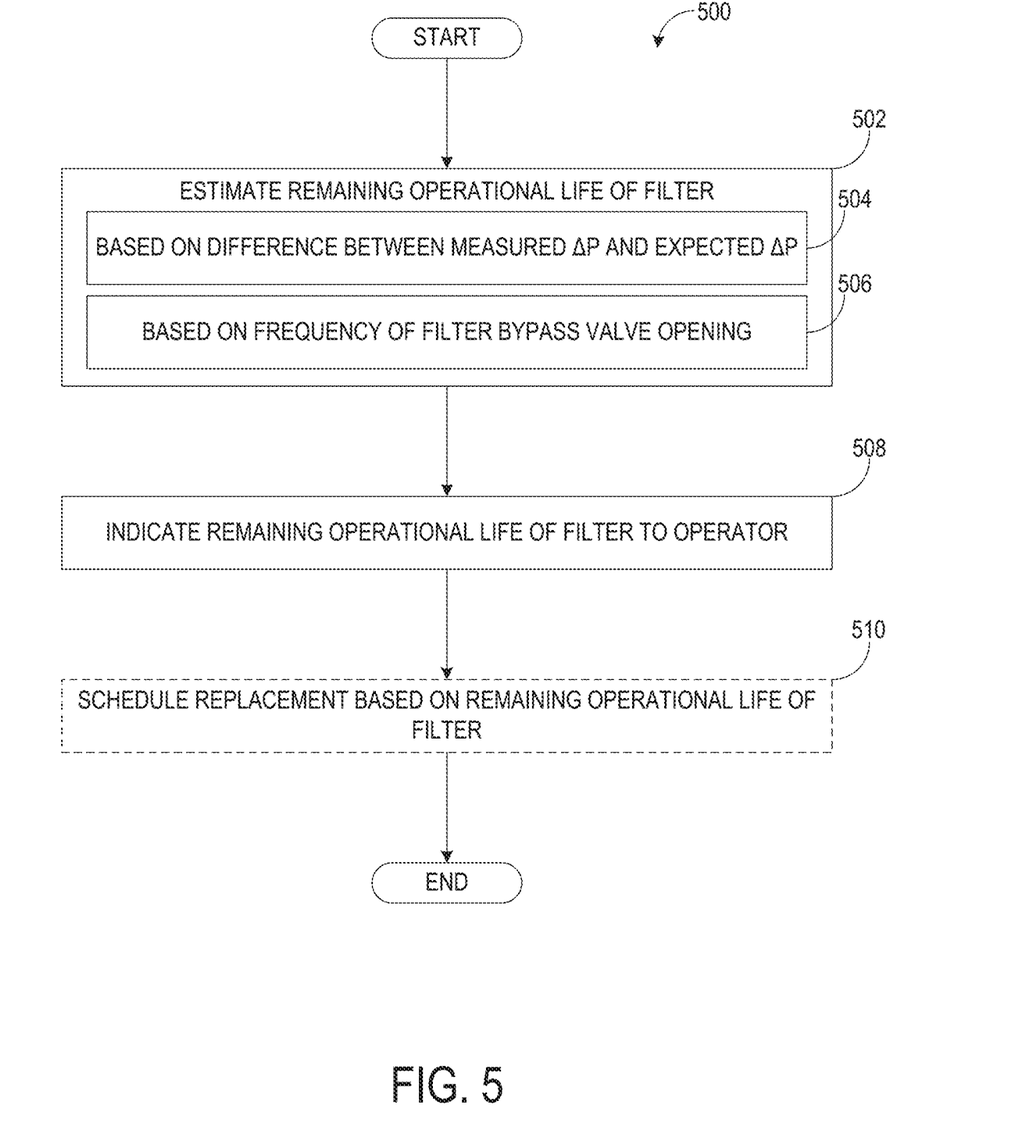
FIG. 5 shows a flowchart illustrating a prognostic routine for a filter in an oil circuit.

Various systems and methods are provided for a lubricant filter. In one example, a method for a lubricant filter comprises indicating a condition of the filter based on a difference between a measured pressure differential and an expected pressure differential during select conditions in which all lubricant pumped by a pump upstream of the filter flows into the filter. FIG. 1 shows an example oil circuit of an internal combustion engine, FIG. 2 shows another example oil circuit of an internal combustion engine, FIG. 3 is a schematic diagram showing an example engine, FIGS. 4A-B show a flowchart illustrating a diagnostic routine for a filter in an oil circuit, and FIG. 5 shows a flowchart illustrating a prognostic routine for a filter in an oil circuit. The engine of FIG. 3 also includes a controller configured to carry out the methods depicted in FIGS. 4A-5.

FIG. 1 schematically shows an example oil circuit 1 of an internal combustion engine 50. Details regarding an example engine which may be engine 50 are provided below with reference to FIG. 3. Oil circuit 1 comprises a cylinder head oil circuit 1a, a cylinder block oil circuit 1b, and an oil sump 1c which enables the storage and distribution of engine oil.

To enable the circulation of engine oil through oil circuit 1, an oil pump 2 is in fluidic communication with oil sump 1c via a suction line 3. Oil pump 2 may thus drive oil flow by suctioning oil from oil sump 1c through suction line 3 and pumping the suctioned oil to components downstream of the oil pump. In some examples, suction line 3 may be sized to provide a desired flow rate of oil to oil pump 2. Moreover, oil pump 2 may be configured to provide various desired aspects of oil flow, such as a desired oil pressure or a desired oil volume flow rate as described in further detail below.

In some implementations, oil pump 2 is mechanically driven by engine 50—for example, the oil pump may be coupled to a crankshaft (e.g., crankshaft 40 of FIG. 3) of the engine. In this case, determining the speed of oil pump 2 may include determining the speed of engine 50, as the pump speed may be directly proportional to the engine speed. Embodiments in which oil pump 2 is electrically driven are within the scope of this disclosure, however. Oil pump 2 may be a positive or fixed displacement pump, in which case the oil pump may be of various suitable types, including but not limited to a gear pump, a trochoid pump, a vane pump, a plunger pump, etc. In other examples, oil pump 2 may be a variable displacement pump. In the case that oil pump 2 is a variable displacement pump, the oil pump may be controlled on the basis of a desired outlet pressure and may include a mechanical-hydraulic feedback mechanism to alter its displacement so as to achieve the desired outlet pressure. In other examples, oil pump 2 may be controlled on the basis of a desired displacement and may include a mechanism to provide pressure feedback such as an electronic oil pressure sensor.

Positioned downstream of oil pump 2 is a pressure relief valve 22, which is in fluidic communication with the outlet of the oil pump at a first end and with oil sump 1c at a second end opposite the first end. Pressure relief valve 22 may be configured to divert oil flow away from downstream components and back to oil sump 1c when the outlet pressure of oil pump 2 exceeds a threshold pressure, thereby limiting the oil pressure in oil circuit 1. Pressure relief valve 22 may be a check valve that requires a given pressure to open, for example. It will be appreciated that pressure relief valve 22 may assume other locations within oil circuit 1 without departing from the scope of this disclosure. FIG. 2 illustrates one such alternative placement of a pressure relief valve within an oil circuit.

A variety of lubricant-receiving components 5 are positioned along a supply line 4, which generally provides a fluidic pathway along which oil may flow to such lubricant-receiving components. Lubricant-receiving components 5 may include at least two bearings (e.g., camshaft bearings, crankshaft bearings, etc.), camshaft mountings, and/or crankshaft mountings. Lubricant-receiving components 5 may include additional lubricant-receiving components not shown in FIG. 1, including but not limited to a connecting rod, balancer shaft, a piston head, etc. The piston head may be sprayed with oil via a nozzle, for example, and the nozzle may be positioned below the piston head. Lubricant-receiving components 5 may further include a hydraulically actuated camshaft adjuster or other valve gear components, for hydraulic valve clearance adjustment.

As shown in FIG. 1, supply line 4 is in fluidic communication with the outlet of oil pump 2 and the inlet of a lubricant filter 6, and pressure relief valve 22 is in fluidic communication with this portion of the supply line interposed between the oil pump and filter. Supply line 4 feeds to filter 6, which is positioned downstream of oil pump 2. Filter 6 may be any suitable filter for removing particulates from oil in oil circuit 1. For example, filter 6 may be a cartridge that removes particulates that are greater than a pore size of the filter. As another example, filter 6 may be magnetic and thus may sequester ferromagnetic particles. As yet another example, filter 6 may trap particulates via sedimentation, centrifugal forces, or another method for removing particulates from oil.

Filter 6 includes a filter bypass valve 6a configured to allow oil to bypass the filter responsive to the oil pressure in oil circuit 1 exceeding a relief pressure setpoint at which the bypass valve is configured to open. Filter bypass valve 6a may prevent the formation of unacceptably high pressure differentials across filter 6 that might otherwise degrade the filter, and provides a bypass around the filter for scenarios in which the filter is clogged. Oil bypassing filter 6 (e.g., when filter bypass valve 6a is open) may be referred to as "unfiltered" oil.

The friction exhibited by lubricant-receiving components 5 (e.g., crankshaft bearings) may vary as a function of the viscosity and consequently the temperature of the oil supplied thereto. Such friction may also affect fuel consumption by engine 50. Accordingly, oil circuit 1 includes an oil cooler/heater 7 configured to at least partially control the temperature of oil in the oil circuit and to reduce friction losses in lubricant-receiving components 5. As shown in FIG. 1, oil cooler/heater 7 is positioned downstream of filter 6 and is in fluidic communication with the filter via supply line 4. Oil cooler/heater 7 may selectively remove/add heat from oil flowing through oil circuit 1—for example, it would not remove heat during warm up of engine 50. In some examples, oil cooler/heater 7 may remove heat from oil via air cooling and/or liquid cooling. In one specific example, oil cooler/heater 7 may utilize coolant from an engine cooling circuit to remove heat from oil. It will be appreciated that the location of oil cooler/heater 7 may be adjusted without departing from the scope of this disclosure. For example, in alternative embodiments oil cooler/heater 7 may be positioned upstream of filter 6.

Following flow through oil cooler/heater 7, engine oil may then flow to a main oil gallery 8 via supply line 4. In the depicted configuration, main oil gallery 8 forms part of cylinder block oil circuit 1b. As such, main oil gallery 8 may be arranged in a cylinder block of engine 50. A plurality of ducts 8a branch off from main oil gallery 8 and lead to five main bearings 9a of a crankshaft of engine 50 (e.g., crankshaft 40 of FIG. 3) and four big-end bearings 9 to thereby lubricate the bearings. A main supply duct, which may be aligned along the longitudinal axis of the crankshaft, may form at least a portion of the main oil gallery 8. The main supply duct may be arranged above or below the crankshaft in a crankcase or it may be integrated into the crankshaft. In some examples, oil may be supplied to the bearings non-continuously to increase the pressure in the oil circuit 1 and specifically in the main oil gallery 8.

Supply line 4 fluidly couples cylinder block oil circuit 1b to cylinder head oil circuit 1a, thereby enabling the supply of oil to various lubricant-receiving components 5 included in the cylinder head oil circuit, such as bearings 10a and 11a respectively associated with two camshaft mountings 10 and 11. Supply ducts branching off from main oil gallery 8 may provide oil to camshaft mountings 10 and 11, for example. In some examples the supply ducts may traverse a cylinder block of engine 50, and when the camshaft is an overhead camshaft, the supply ducts may traverse a cylinder head of the engine.

As, in the configuration depicted in FIG. 1, oil flows from oil sump 1c first to cylinder block oil circuit 1b and then to cylinder head oil circuit 1a, oil may be first supplied to a cylinder block of engine 50 and then to a cylinder head of the engine. Consequently, oil may be initially heated during flow through the cylinder block and then further heated during subsequent flow through the cylinder head. Such a configuration may enable rapid heating of oil in oil circuit 1, which may be desired following restart of engine 50, for example. It will be appreciated, however, that alternative configurations are possible without departing from the scope of this disclosure. For example, in other embodiments oil may be first supplied to the cylinder head of engine 50 and subsequently to the cylinder block of the engine. In yet other embodiments, separate supply lines may be provided for the cylinder head and block (e.g., for circuits 1a and 1b) in a parallel configuration such that both the cylinder head and block can be simultaneously fed oil if desired.

Oil circuit 1 further includes return lines 13 branching off from at least one of the two camshaft mountings 10 and 11 and from main oil gallery 8 to enable the return of oil to oil sump 1c following flow through lubrication-receiving components 5. The return of oil to oil sump 1c via return lines 13 may be driven by gravity, for example. In some embodiments, return lines 13 may be positioned in low-temperature areas and/or adjacent to any liquid cooling provided for the cylinder head and/or cylinder block of engine 50. In this way, the likelihood of the oil in the return lines 13 increasing beyond a desired operating temperature is decreased; excessive temperatures of oil in return lines 13 can adversely affect various characteristics of the return oil such as lubricating quality, and can cause more rapid aging of the return oil.

Since the operation of filter 6 significantly affects oil supply to lubricant-receiving components 5, and thus operation of engine 50, assessment of the condition of the filter may be desired. For example, knowledge of whether or not filter 6 is significantly clogged and/or whether filter bypass valve 6a is opening may be desired. Further, knowledge of the remaining operational life of filter 6 may be desired, for example in an attempt to provide a vehicle operator an estimate of the number of miles left until replacement of the filter is recommended. Accordingly, oil circuit 1 includes a differential pressure sensor 14 configured to provide an indication of the pressure differential across filter 6 by sensing oil pressure upstream and downstream of the filter. Indications of the pressure differential across filter 6 may be used to perform both diagnostics on the filter—e.g., assessments of the current condition of the filter such as whether or not it is clogged—and prognostics on the filter—e.g., the remaining operational life of the filter. As shown in FIG. 1, differential pressure sensor 14 provides indications of the differential filter pressure (e.g., as a single differential pressure signal or as two signals respectively indicating pressure upstream and downstream of the filter) to a controller 12, described below with reference to FIG. 3. In some examples, differential pressure sensor 14 may sense oil pressure upstream of the inlet of filter bypass valve 6a.

To perform diagnostics and prognostics on filter 6, the measured pressure differential across the filter as sensed by differential pressure sensor 14 may be compared to an expected pressure differential across the filter. Diagnostics may conclude, for example, that filter 6 is partially clogged (e.g., not fully clogged or unclogged) if the measured pressure differential is greater than the expected pressure differential. Partial clogging of filter 6 may indicate that some portion of the operational life of the filter remains and that replacement of the filter is not yet recommended, for example. Alternatively or additionally, diagnostics may conclude that filter 6 is fully clogged if the measured pressure differential is greater than the expected pressure differential and near (e.g., within 10%) the relief pressure setpoint of filter bypass valve 6a at which the bypass valve is configured to open. Alternatively or additionally, diagnostics may conclude that the relief pressure setpoint of filter bypass valve 6a may be excessive if the measured pressure differential is substantially greater than the relief pressure setpoint—e.g., by 10% or more. Alternatively or additionally, diagnostics may make no conclusion as to the condition of filter 6 or filter bypass valve 6a if the expected pressure differential is near the relief pressure setpoint of the filter bypass valve.

In some examples, the expected pressure differential across filter 6 may be determined based on the flow rate of oil in oil circuit 1 (e.g., at the inlet of the filter) and the viscosity of the oil. The Hagen-Poiseuille equation provides a non-limiting example illustrating how an expected pressure drop (e.g., differential) across a fluid-receiving device can be determined based on flow rate and viscosity; the equation may assume the following form: $\Delta P = (8*\mu*L*Q)/(\pi*r^4)$, where $\Delta P$ is the expected pressure drop, $\mu$ is the dynamic viscosity, L is the length of the cylindrical pipe in which fluid flows, Q is the volumetric flow rate of the fluid, $\pi$ is the mathematical constant pi, and r is the radius of the cylindrical pipe. As can be seen from this equation, the expected pressure drop is directly proportional to both the fluid flow rate and the fluid viscosity. The Hagen-Poiseuille equation particularly yields the pressure drop for a long cylindrical pipe, which may not be the geometric configuration assumed by filter 6. However, lubricant flow through filter 6 may be in the laminar regime; thus, the pressure drop across filter 6 may be directly proportional to both lubricant flow and dynamic viscosity.

Determination of the expected pressure differential across filter 6 may include assessing one or more aspects of operation of oil pump 2, as oil flow rate in oil circuit 1 may be a function of operation of the oil pump. In some examples, the oil flow rate in oil circuit 1 (e.g., at the inlet of filter 6) may be determined based on the speed of oil pump 2. Determination of the speed of oil pump 2 may include determining the speed of engine 50 for embodiments in which the oil pump is mechanically driven by the engine, as the pump speed may be directly proportional to the engine speed. In some examples, determination of the oil flow rate may further include determining the displacement of oil pump 2. For embodiments in which oil pump 2 is a positive displacement pump, the pump displacement may be known, stored in, and retrieved from controller 12, for example. For embodiments in which oil pump 2 is a variable displacement pump, the pump displacement may be determined via a positional feedback mechanism in the pump. Alternatively (e.g., if the positional feedback mechanism is not provided), the pump displacement may be inferred based on one or more known displacements—for example, the pump displacement corresponding to the minimum output (e.g., flow rate, pressure) of the pump and the pump displacement corresponding to the maximum output of the pump may be used to infer (e.g., interpolate) the pump displacement corresponding to an intermediate output between the minimum and maximum outputs.

When either pressure relief valve 22 or filter bypass valve 6a opens as a result of oil pressure in oil circuit 1 exceeding a respective relief pressure setpoint, filter 6 does not receive the entirety of oil flow pumped by oil pump 2—at least a portion of oil flow bypasses the filter via the filter bypass valve and/or returns to oil sump 1c before reaching the filter via the pressure relief valve. The oil flow rate through filter 6 may thus be unknown without measuring or inferring oil flow through pressure relief valve 22 and/or filter bypass valve 6a. Lacking knowledge of the oil flow rate through filter 6, the expected pressure drop across the filter may be unable to be accurately determined, preventing the performance of diagnostics and/or prognostics on the filter that utilize expected pressure drop. Thus, in some embodiments diagnostics and/or prognostics that use the expected pressure drop across filter 6 may be determined only under select conditions in which neither of pressure relief valve 22 and filter bypass valve 6a is open and oil flow through oil circuit 1 can be entirely attributed to flow through the filter. Put another way, diagnostics and/or prognostics may be only performed on filter 6 of oil circuit 1 if the oil pressure (e.g., outlet pressure of oil pump 2) in the oil circuit does not exceed the respective relief pressure setpoints of pressure relief valve 22 and filter bypass valve 6a. Under these conditions, the flow rate produced by oil pump 2 may be substantially equal to the flow rate through filter 6, and as such the filter flow rate may be parameterized by the oil pump flow rate.

Oil viscosity, which as described above may be used along with oil flow rate to determine the expected pressure differential across filter 6, may be inferred from oil temperature, as oil viscosity may correlate with oil temperature for some types of oil. The temperature of oil in oil circuit 1 may be determined via an oil temperature sensor (not shown), or alternatively inferred from readings output by one or more sensors of engine 50 described below with reference to FIG. 3, such as an engine coolant temperature sensor. Determination of oil viscosity may alternatively or additionally include retrieving a predetermined oil viscosity of oil intended for engine 50 from controller 12. Oil having the predetermined oil viscosity may have been installed in engine 50 upon manufacture, for example. Deviation from the predetermined oil viscosity—or an expected oil viscosity in general—may be detected based on operation of oil pump 2. For example, an expected oil pressure may be determined based on engine speed and engine coolant temperature and compared to a measured oil pressure (e.g., measured via differential pressure sensor 14 or a non-differential pressure sensor not shown in FIG. 1); deviation from the expected oil pressure may indicate deviation from an expected oil viscosity. In some examples, a detected deviation may be used to adjust a predetermined oil viscosity.

In some implementations, a suitable data structure (e.g., lookup table) may store a plurality of expected pressure differentials across filter 6, enabling retrieval of expected pressure differentials by accessing the data structure with one or more suitable indices. For embodiments in which oil pump 2 is a positive displacement pump, the indices may include engine speed and oil temperature, as these parameters may determine oil flow rate and oil viscosity and thus an expected pressure differential. For embodiments in which oil pump 2 is a variable displacement pump, the indices may include engine speed, oil temperature, and pump displacement. The data structure may be stored in controller 12, for example.

Diagnostics performed on filter 6 may account for conditions in which a relatively high pressure differential across the filter is expected and not indicative of degraded filter or filter bypass valve operation. For example, a relatively high pressure differential across filter 6 may be considered nominal if the product of oil flow rate in oil circuit 1 and the viscosity of the oil is relatively high. Such conditions may occur during cold start of engine 50, for example, due to the high viscosity exhibited by some engine oils at relatively cold temperatures. In some scenarios, such conditions may also cause filter bypass valve 6a to open, whose opening may be considered normal under such conditions.

Known conditions in which a relatively high pressure differential across filter 6 is expected may also be utilized to recognize degradation (e.g., clogging) of the filter and potentially recommend replacement of the filter to a vehicle operator. For example, opening of filter bypass valve 6a may be expected during cold engine start and considered indicative of normal filter operation as described above. This expectation may be used such that opening of filter bypass valve 6a during conditions other than cold start is recognized as an indication that filter 6 has degraded—e.g., reached the end of its operational life. Various actions may be performed responsive to determining that filter 6 has reached the end of its operational life, including one or more of indicating filter end-of-life via a dashboard indicator, setting a diagnostic code in an engine controller, etc. The results of prognostics described herein may also be indicated via such means; for example, a prognostic indicating that a portion of the operational life of filter 6 remains may be followed by indicating the remaining operational life to a vehicle operator (e.g., miles left to replacement via a dashboard indicator). Alternatively or additionally, a timer may be set in an engine controller such that, upon expiration of the timer, the vehicle operator is notified of extinction of the remaining operational life (as determined by the prognostic or a subsequent diagnostic/prognostic) and/or engine operation is modified to compensate for filter degradation.

Opening of filter bypass valve 6a may also be utilized to perform diagnostics on the filter bypass valve itself. One such diagnostic may include assessing the relief pressure setpoint at which filter bypass valve 6a is configured to open. In this diagnostic, the actual pressure relief setpoint may be determined based on output from differential pressure sensor 14 responsive to opening of filter bypass valve 6a, as the differential pressure sensor will read the actual setpoint of the bypass valve when the bypass valve is open. The relief pressure setpoint read by differential pressure sensor 14 under these conditions (e.g., during opening of filter bypass valve 6a, which may be detected via output from a position switch described below) may be compared to one or both of an upper threshold and a lower threshold. If the read pressure relief setpoint exceeds the upper threshold, the diagnostic may conclude that the setpoint is faulted high, which may allow excessively large pressure differentials to form across filter 6 that can potentially degrade filter operation. It may then be indicated (e.g., via dashboard indicators, setting a diagnostic code, etc.) that the setpoint is faulted high if exceeding the upper threshold. If the read relief pressure setpoint falls below the lower threshold, the diagnostic may conclude that the setpoint is faulted low, which may increase the proportion of unfiltered oil passed to engine 50, which can reduce the operational life of the engine. It may then be indicated that the setpoint is faulted low if falling below the lower threshold. This filter bypass valve diagnostic may thus be performed only during select conditions in which filter bypass valve 6a is open, and the oil pumped from the outlet of pump 2 does not entirely flow through filter 6.

Prognostics performed on filter 6 may assess the difference between the measured pressure differential across the filter and the relief pressure setpoint of filter bypass valve 6a. For example, an estimation of the remaining operational life of filter 6 may be determined based on this difference. As a specific non-limiting example, an estimation of the distance (e.g., miles) remaining until filter replacement is recommended may be determined by computing the absolute value of the difference between the measured pressure differential and the relief pressure setpoint and multiplying the absolute value of this difference by a constant relating pressure to distance.

FIG. 1 illustrates the potential inclusion of a position switch 16 which may be used to perform prognostics on filter 6. Position switch 16 may be coupled to filter bypass valve 6a such that the position switch outputs a signal each time the filter bypass valve opens. In this configuration, an estimate of the remaining operational life of filter 6 may be determined based on the frequency of filter bypass valve opening. As a specific non-limiting example, an estimation of the distance remaining until filter replacement is recommended may be determined by computing the inverse frequency of filter bypass valve opening and multiplying this inverse frequency by a constant relating frequency to distance. Alternatively or additionally, changes in the filter bypass valve opening frequency over time may be monitored to assess the condition of filter 6.

It will be appreciated that oil circuit 1 is provided as an example and that various modifications to the oil circuit are possible without departing from the scope of this disclosure. For example, the number of lubricant-receiving components 5 and the relative positioning of components in oil circuit 1 are non-limiting. In some embodiments, position switch 16 may be omitted from oil circuit 1. Moreover, while described with reference to engine oil, it will be appreciated that the approaches described herein may apply to fluid circuits that circulate other types of lubricants and fluids. Still further, embodiments are possible in which diagnostics and prognostics are performed for filter 6 using a non-differential pressure sensor—e.g., a sensor that outputs a single pressure reading. In this example, the measured pressure differential across filter 6 may be determined based on the difference between the single pressure reading and the commanded pressure according to which oil pump 2 may be driven.

FIG. 2 schematically shows an example oil circuit 1' of an internal combustion engine 50'. It is sought to explain the differences between FIGS. 1 and 2, and as such, like parts are numbered similarly. As can be seen in FIG. 2, oil circuit 1' exhibits a configuration similar to that of oil circuit 1 of FIG. 1. Unlike oil circuit 1 of FIG. 1, however, oil circuit 1' includes a pressure relief valve 22' positioned downstream of filter 6 and upstream of oil cooler/heater 7. In this configuration, the outlet of an oil pump 2' feeds directly into a junction joining the inlet of filter 6 to filter bypass valve 6a, whereas in oil circuit 1 of FIG. 1 pressure relief valve 22 is interposed between these two locations.

In some embodiments, oil pump 2' may specifically be a variable displacement pump and not a fixed displacement pump. In this example, the operation of oil pump 2' may cooperate with the placement of pressure relief valve 22' to enable oil flow through oil circuit 1' to be controlled on the basis of volume flow rate, alternatively or in addition to on the basis of pressure. More specifically, oil pump 2' may be controlled such that the outlet pressure of the oil pump does not exceed the relief pressure setpoint of filter bypass valve 6a (and optionally such that the outlet pressure of the oil pump does not exceed the relief pressure setpoint of pressure relief valve 22'), preventing opening of the filter bypass valve and optionally opening of the pressure relief valve. Under these select conditions, all of the oil pumped from the outlet of oil pump 2' flows through filter 6 and not through pressure relief valve 22' or filter bypass valve 6a. With sufficient knowledge of the operation of oil pump 2', the oil flow rate through filter 6 can be accurately determined, enabling accurate determination of an expected pressure drop across the filter and correlation of some types of pressure drops across the filter with filter clogging. Use of a variable displacement pump may enable the oil pressure in oil circuit 1' to be maintained below the relief pressure setpoint of filter bypass valve 6a (and optionally the relief pressure setpoint of pressure relief valve 22') at a higher frequency as compared to use of a fixed displacement pump. This may consequently increase the proportion of engine/vehicle operation in which diagnostics and/or prognostics may be performed on filter 6, as oil flow rate and thus expected pressure drop may be definitively determined. Embodiments are contemplated, however, in which oil pump 2' is a fixed displacement pump, in which case diagnostics and/or prognostics that evaluate an expected pressure differential across filter 6 may be performed only under select conditions under which oil flow goes entirely through the filter and does not bypass the filter through filter bypass valve 6a.

With the outlet pressure of oil pump 2' limited such that all oil flow pumped from the outlet of the oil pump can be attributed to flow through filter 6, the expected pressure differential across the filter may be determined and compared to the measured pressure differential across the filter as sensed by differential pressure sensor 14 in a manner similar to that described above. For example, the expected pressure differential across filter 6 may be determined as a function of oil flow rate through oil circuit 1 and oil viscosity. As described above, oil flow rate may be determined based on the speed of oil pump 2 (e.g., which may be determined based on engine speed for embodiments in which the oil pump is mechanically driven by engine 50) and the displacement of the oil pump for embodiments in which the oil pump is a variable displacement pump, while oil viscosity may be inferred from oil temperature, which may or may not include assessing a predetermined oil viscosity.

As with oil circuit 1 of FIG. 1, diagnostics may conclude that filter 6 of oil circuit 1' is partially clogged (e.g., not fully clogged or unclogged) if the measured pressure differential across the filter is greater than the expected pressure differential. Alternatively or additionally, diagnostics may conclude that filter 6 is fully clogged if the measured pressure differential is greater than the expected pressure differential and near (e.g., within 10%) the relief pressure setpoint of filter bypass valve 6a at which the bypass valve is configured to open. Alternatively or additionally, diagnostics may conclude that the relief pressure setpoint of filter bypass valve 6a may be excessive if the measured pressure differential is substantially greater than the relief pressure setpoint—e.g., by 10% or more. Alternatively or additionally, diagnostics may make no conclusion as to the condition of filter 6 or filter bypass valve 6a if the expected pressure differential is near the relief pressure setpoint of the filter bypass valve. As described above, high pressure differentials across filter 6 may be expected and considered indicative of nominal, non-degraded operation of the filter under some conditions such as engine cold start.

FIG. 3 is a schematic diagram showing an example engine 100, which may be included in a propulsion system of an automobile. In some embodiments, engine 100 may be engine 50 of FIG. 1 or engine 50' of FIG. 2. Although not shown in FIG. 3, engine 100 may be lubricated by a suitable lubrication system such as oil circuit 1 of FIG. 1 or oil circuit 1' of FIG. 2.

The engine 100 is shown with four cylinders 30. However, other numbers of cylinders may be used in accordance with the current disclosure. Engine 100 may be controlled at least partially by a control system including controller 12, and by input from a vehicle operator 132 via an input device 130. In this example, input device 130 includes an accelerator pedal and a pedal position sensor 134 for generating a proportional pedal position signal PP. Each combustion chamber (e.g., cylinder) 30 of engine 100 may include combustion chamber walls with a piston (not shown) positioned therein. The pistons may be coupled to a crankshaft 40 so that reciprocating motion of the piston is translated into rotational motion of the crankshaft. Crankshaft 40 may be coupled to at least one drive wheel of a vehicle via an intermediate transmission system (not shown). Further, a starter motor may be coupled to crankshaft 40 via a flywheel to enable a starting operation of engine 100.

Combustion chambers 30 may receive intake air from intake manifold 44 via intake passage 42 and may exhaust combustion gasses via exhaust passage 48. Intake manifold 44 and exhaust manifold 46 can selectively communicate with combustion chamber 30 via respective intake valves and exhaust valves (not shown). In some embodiments, combustion chamber 30 may include two or more intake valves and/or two or more exhaust valves.

Fuel injectors 51 are shown coupled directly to combustion chamber 30 for injecting fuel directly therein in proportion to the pulse width of signal FPW received from controller 12. In this manner, fuel injector 51 provides what is known as direct injection of fuel into combustion chamber 30. The fuel injector may be mounted in the side of the combustion chamber or in the top of the combustion chamber, for example. Fuel may be delivered to fuel injector 51 by a fuel system (not shown) including a fuel tank, a fuel pump, and a fuel rail. In some embodiments, combustion chambers 30 may alternatively, or additionally, include a fuel injector arranged in intake manifold 44 in a configuration that provides what is known as port injection of fuel into the intake port upstream from each combustion chamber 30.

Intake passage 42 may include throttle 21 and 23 having throttle plates 20 and 24, respectively. In this particular example, the position of throttle plates 20 and 24 may be varied by controller 12 via signals provided to an actuator included with throttles 21 and 23. In one example, the actuators may be electric actuators (e.g., electric motors), a configuration that is commonly referred to as electronic throttle control (ETC). In this manner, throttles 21 and 23 may be operated to vary the intake air provided to combustion chamber 30 among other engine cylinders. The position of throttle plates 20 and 24 may be provided to controller 12 by throttle position signal TP. Intake passage 42 may further include a mass air flow sensor 120, a manifold air pressure sensor 122, and a throttle inlet pressure sensor 123 for providing respective signals MAF (mass airflow) MAP (manifold air pressure) to controller 12.

Exhaust passage 48 may receive exhaust gasses from cylinders 30. Exhaust gas sensor 128 is shown coupled to exhaust passage 48 upstream of turbine 62 and emission control device 78. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO, a NOx, HC, or CO sensor, for example. Alternatively, sensor 128 may be positioned downstream of turbine 62. Emission control device 78 may be a three way catalyst (TWC), NOx trap, various other emission control devices, or combinations thereof.

Exhaust temperature may be measured by one or more temperature sensors (not shown) located in exhaust passage 48. Alternatively, exhaust temperature may be inferred based on engine operating conditions such as speed, load, AFR, spark retard, etc.

Controller 12 is shown in FIG. 3 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 100, in addition to those signals previously discussed, including measurement of inducted mass air flow (MAF) from mass air flow sensor 120; engine coolant temperature (ECT) from temperature sensor 112, shown schematically in one location within the engine 100; a profile ignition pickup signal (PIP) from Hall effect sensor 118 (or other type) coupled to crankshaft 40; the throttle position (TP) from a throttle position sensor, as discussed; and absolute manifold pressure signal, MAP, from sensor 122, as discussed. Engine speed signal, RPM, may be generated by controller 12 from signal PIP. Manifold pressure signal MAP from a manifold pressure sensor may be used to provide an indication of vacuum, or pressure, in the intake manifold 44. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft 40. In some examples, storage medium read-only memory 106 may be programmed with computer readable data representing instructions executable by processor 102 for performing the methods described below as well as other variants that are anticipated but not specifically listed.

Engine 100 may further include a compression device such as a turbocharger or supercharger including at least a compressor 60 arranged along intake manifold 44. For a turbocharger, compressor 60 may be at least partially driven by a turbine 62, via, for example a shaft, or other coupling arrangement. The turbine 62 may be arranged along exhaust passage 48 and communicate with exhaust gasses flowing therethrough. Various arrangements may be provided to drive the compressor. For a supercharger, compressor 60 may be at least partially driven by the engine and/or an electric machine, and may not include a turbine. Thus, the amount of compression provided to one or more cylinders of the engine via a turbocharger or supercharger may be varied by controller 12. In some cases, the turbine 62 may drive, for example, an electric generator 64, to provide power to a battery 66 via a turbo driver 68. Power from the battery 66 may then be used to drive the compressor 60 via a motor 70. Further, a sensor 123 may be disposed in intake manifold 44 for providing a BOOST signal to controller 12.

Further, exhaust passage 48 may include wastegate 26 for diverting exhaust gas away from turbine 62. In some embodiments, wastegate 26 may be a multi-staged wastegate, such as a two-staged wastegate with a first stage configured to control boost pressure and a second stage configured to increase heat flux to emission control device 78. Wastegate 26 may be operated with an actuator 150, which may be an electric actuator such as an electric motor, for example, though pneumatic actuators are also contemplated. Intake passage 42 may include a compressor bypass valve 27 configured to divert intake air around compressor 60. Wastegate 26 and/or compressor bypass valve 27 may be controlled by controller 12 via actuators (e.g., actuator 150) to be opened when a lower boost pressure is desired, for example.

Intake passage 42 may further include charge air cooler (CAC) 80 (e.g., an intercooler) to decrease the temperature of the turbocharged or supercharged intake gasses. In some embodiments, charge air cooler 80 may be an air to air heat exchanger. In other embodiments, charge air cooler 80 may be an air to liquid heat exchanger.

Further, in the disclosed embodiments, an exhaust gas recirculation (EGR) system may route a desired portion of exhaust gas from exhaust passage 48 to intake passage 42 via EGR passage 140. The amount of EGR provided to intake passage 42 may be varied by controller 12 via EGR valve 142. Further, an EGR sensor (not shown) may be arranged within the EGR passage and may provide an indication of one or more of pressure, temperature, and concentration of the exhaust gas. Alternatively, the EGR may be controlled through a calculated value based on signals from the MAF sensor (upstream), MAP (intake manifold), MAT (manifold gas temperature) and the crank speed sensor. Further, the EGR may be controlled based on an exhaust $O_2$ sensor and/or an intake oxygen sensor (intake manifold). Under some conditions, the EGR system may be used to regulate the temperature of the air and fuel mixture within the combustion chamber. FIG. 3 shows a high pressure EGR system where EGR is routed from upstream of a turbine of a turbocharger to downstream of a compressor of a turbocharger. In other embodiments, the engine may additionally or alternatively include a low pressure EGR system where EGR is routed from downstream of a turbine of a turbocharger to upstream of a compressor of the turbocharger.

FIGS. 4A-B show a flowchart illustrating a diagnostic routine 400 for a filter in an oil circuit. Routine 400 may be applied to one or both of oil circuits 1 and 1' of FIGS. 1 and 2, respectively, to assess the condition of filter 6, for example. Further, routine 400 may be stored as instructions on computer-readable storage (e.g., memory of controller 12 of FIGS. 1-3) and executed by a processor (e.g., CPU 102 of controller 12). It will be appreciated that aspects of routine 400 may vary depending on the configuration of the oil circuit and/or pump to which the method is applied, as described below. Moreover, routine 400 may be employed to lubrication circuits that circulate lubricants other than oil.

At 402 of routine 400, it is determined whether oil flowing through the oil circuit is flowing entirely through the filter and is not bypassing the filter. Oil bypassing the filter may do so by flowing around the filter via a filter bypass valve (e.g., filter bypass valve 6a of FIGS. 1 and 2) and/or via a pressure relief valve (e.g., pressure relief valves 22, 22' of FIGS. 1 and 2, respectively) positioned upstream of the filter, for example. A determination that oil flows entirely through the filter, and does not bypass the filter, enables assessment of the condition of the filter on the basis of an expected pressure differential across the filter. Determination of the expected pressure differential may involve accurately assessing the flow rate of oil through the filter, which in some examples can only be facilitated if oil does not bypass the filter. As such, in some examples the condition of the filter may be assessed on the basis of an expected pressure differential cross the filter only during select conditions in which oil pumped from the outlet of a pump flows entirely into an inlet of the filter and does not bypass the filter, for example via a filter bypass valve configured to bypass oil around the filter for oil pressures greater than or equal to a setpoint of the bypass valve, or a pressure relief valve which may be interposed between the pump and the filter.

Determining whether oil flowing through the oil circuit is flowing entirely through the filter and is not bypassing the filter at 402 may include, at 404, determining whether engine speed is greater than a threshold speed. Since the outlet pressure of a pump driving oil flow through the oil circuit may be proportional to engine speed (e.g., due to being mechanically driven by the engine), engine speeds above the threshold speed may correlate to pump outlet pressures that exceed the relief setpoint of one or both of the filter bypass valve and the pressure relief valve. In other words, one or both of the filter bypass valve and the pressure relief valve may open at engine speeds above the threshold speed, in which case oil does not flow entirely through the filter. Engine speed may be determined based on output from a sensor such as sensor 118 of FIG. 3 as described above. For embodiments in which the pump is a fixed displacement pump, mitigation of pump outlet pressures that cause opening of one or both of the filter bypass valve and the pressure relief valve, and thus oil bypass around the filter, may not be possible. For embodiments in which the pump is a variable displacement pump, however, pump outlet pressure may be limited so that oil does not bypass the filter by adjusting the displacement of the pump, even at engine speeds above the threshold speed. If it is determined at 404 that the engine speed exceeds the threshold speed (YES), routine 400 proceeds to 406. If it is determined at 404 that the engine speed is less than or equal to the threshold speed (NO), routine 400 proceeds to 408.

At 406 of routine 400, it is determined whether or not the pump is a fixed displacement pump. An engine controller may store the type of pump employed in the oil circuit; as such, determining whether or not the pump is a fixed displacement pump may include retrieving the pump type from the engine controller. If it is determined that the pump is a fixed displacement pump (YES), routine 400 returns to 404. In this way, assessment of the filter condition may be suppressed for conditions in which oil bypasses the filter and pump operation cannot be adjusted to drive oil flow entirely through the filter. If it is determined that the pump is not a fixed displacement pump (NO), routine 400 proceeds to 408. In this case, the pump may be a variable displacement pump.

At 408 of routine 400, the displacement of the pump may be optionally adjusted, for embodiments in which the pump is a variable displacement pump, so that the outlet pressure of the pump is less than the setpoints of the filter bypass valve and the pressure relief valve. For embodiments in which the pressure relief valve is positioned downstream of the filter, however, pump displacement may be modified to limit pump outlet pressure below the filter bypass valve setpoint, and not to limit pump outlet pressure below the pressure relief valve setpoint. It will be appreciated that, depending on the configuration of the variable displacement pump, either adjustments to the pump displacement or adjustments to the pump outlet pressure may be commanded (e.g., by an engine controller such as controller 12 of FIGS. 1-3). For embodiments in which adjustments to the pump outlet pressure are commanded, the pump displacement may adjusted by commanding adjustments to the pump outlet pressure, which may include limiting the pump outlet pressure below the setpoint of the filter bypass valve and the setpoint of the pressure relief valve if positioned upstream of the filter. For embodiments in which adjustments to the pump displacement are commanded, a suitable data structure (e.g., lookup table) or transfer function may be employed to determine a corresponding change in pump outlet pressure for a given adjustment in pump displacement. The determined change in pump outlet pressure may be compared to one or both of the setpoints of the filter bypass valve and the pressure relief valve to determine a suitable adjustment to displacement. Pump displacement may be decreased as engine speed increases, for example, to maintain pump outlet pressure below excessive pressures that cause oil bypass around the filter. It will be appreciated that, in some scenarios, the pump displacement may not be modified even if it was determined at 404 that engine speed exceeds the threshold speed, as the corresponding pump outlet pressure for the unadjusted pump displacement may not cause oil to bypass the filter.

It will be appreciated that other actions may be performed as part of determining whether oil flowing through the oil circuit is flowing entirely through the filter and is not bypassing the filter at 402, alternatively or in addition to those described above. For example, a pressure sensor positioned upstream of the filter, filter bypass valve, and pressure relief valve may be used to determine whether the pump outlet pressure is high enough to cause one or both of the filter bypass and pressure relief valves to open. With reference to FIGS. 1 and 2, the upstream pressure sensed by differential pressure sensor 14 may be used for embodiments in which the sensor senses oil pressure upstream of the inlet of filter bypass valve 6a and pressure relief valve 22 (or valve 22'). If an oil pressure that is likely to cause opening of one or both of the filter bypass valve and the pressure relief valve is detected, the condition of the filter may not be assessed according to routine 400 for fixed displacement pump embodiments, whereas pump operation (e.g., outlet pressure, displacement) may be modified for variable displacement embodiments. In other embodiments, a pressure switch may be used to directly detect opening of the filter bypass valve and the pressure relief valve, if coupled thereto.

At 410 of routine 400, an expected pressure differential (ΔP) across the filter is determined. The expected pressure differential may be determined as a product of oil flow rate through the oil circuit and the viscosity of the oil in the oil circuit. As such, determining the expected pressure differential may include, at 412, determining the oil flow rate based on pump operation. For embodiments in which the pump is a fixed displacement pump, the oil flow rate may be determined based on pump speed (e.g., engine speed). For embodiments in which the pump is a variable displacement pump, the oil flow rate may be determined based on pump speed and pump displacement. Determining the expected pressure differential may further include, at 414, determining the oil viscosity based on oil temperature, which as described above may be measured or inferred.

At 415 it is determined whether the expected pressure differential determined at 410 is within a threshold range of the relief pressure setpoint of the filter bypass valve. If it is determined that the expected pressure differential is not within the threshold range of the filter bypass valve setpoint (NO), routine 400 proceeds to 416. If it is determined that the expected pressure differential is within the threshold range of the filter bypass valve setpoint (YES), routine 400 proceeds to 417 where no conclusion is made—e.g., no assessment as to the condition of the filter is made. Following 417, routine 400 ends. Routine 400 may be controlled responsive to the expected pressure differential and the threshold range around the filter bypass valve setpoint in this way so as to prevent erroneous conclusions that may otherwise be reached when the expected pressure differential is within the threshold range of the filter bypass valve setpoint. For example, if the expected pressure differential is within the threshold range of the filter bypass valve setpoint, pressure differentials measured across the filter under these conditions, and that are close to the expected pressure differential, may be interpreted as an indication that the filter is operating normally and that the filter bypass valve is not open. In actuality, however, the filter bypass valve may have been open, for example if the measured pressure differential exceeds the filter bypass valve setpoint (e.g., by 2%). Various suitable threshold ranges may be used. As a non-limiting example, the threshold range may be 10% about the filter bypass valve setpoint, such that expected pressure differentials that are not 10% or closer to the setpoint lead to further execution of routine 400, and expected pressure differentials that are 10% or closer to the setpoint lead to termination of the routine.

At 416 of routine 400, the pressure differential across the filter is measured. The pressure differential across the filter may be measured via a differential pressure sensor such as sensor 14 of FIGS. 1 and 2, for example. Alternative approaches are possible, however, in which a non-differential pressure sensor reading is compared to a commanded pressure to determine the pressure differential across the filter.

Turning now to FIG. 4B, at 418 of routine 400, it is determined whether the measured pressure differential exceeds the expected pressure differential. If it is determined that the measured pressure differential exceeds the expected pressure differential (YES), routine 400 proceeds to 420. If it is determined that the measured pressure differential does not exceed (e.g., is less than or equal to) the expected pressure differential (NO), routine 400 proceeds to 422 where no conclusion is made—e.g., no assessment as to the condition to the filter is made. However, in some approaches, reaching no conclusion at 422 may be considered indicative of nominal filter operation—e.g., that the filter is operating normally and not in a degraded mode (e.g., clogged). Routine 400 may optionally proceed to 423 where the nominal condition of the filter may be indicated to a vehicle operator, which may include providing an estimate of the remaining operational life of the filter to the vehicle operator. A method 500 illustrated in FIG. 5 may be used to estimate the remaining operational life of the filter and provide an indication thereof to the vehicle operator, for example. It will be appreciated that, under some operating conditions, a relatively high pressure differential across the filter may be expected (e.g., during engine cold start); detection of a relatively high pressure differential across the filter under these conditions may be considered indicative of a nominal (e.g., non-degraded) condition of the filter.

At 420 of routine 400, it is determined whether the measured pressure differential is near the relief pressure setpoint of the filter bypass valve. The setpoint of the filter bypass valve (and potentially the setpoint of the pressure relief valve) may be stored in, and retrieved from, an engine controller, or, alternatively, may be determined by sensing the pressure at which the valve opens. Pressure differentials may be considered to be near the relief pressure setpoint if within 5%, for example. If it is determined that the measured pressure differential is near the relief pressure setpoint of the filter bypass valve (YES), routine 400 proceeds to 424. If it is determined that the measured pressure differential is not near (e.g., not within 5% of) the relief pressure setpoint of the filter bypass valve (NO), routine 400 proceeds to 432.

At 424 of routine 400, it is determined that the filter is clogged. In some examples, an extent of clogging may be inferred, for example as a percentage of total clogging, based on the nearness of the measured pressure differential to the filter bypass valve setpoint—for example, a greater extent of clogging may be inferred the closer the measured pressure differential is to the filter bypass valve setpoint. As such, in some examples, partial clogging of the filter may be determined at 424, while in other examples, full clogging (e.g., 100%) may be determined at 424. In some implementations, a relatively greater extent of clogging may be determined at 424 as compared to the determination performed at 438, described below. Clogging of the filter may be considered to correspond to a (e.g., partially) degraded condition of the filter.

Various actions may be optionally performed following 424. For example, at 426, a vehicle operator may be optionally warned of filter clogging, which in some examples may include providing an estimate of the extent of clogging. At 428 of routine 400, a diagnostic code indicating filter degradation may be optionally set in an engine controller. At 430 of routine 400, engine operation may be optionally modified to compensate for filter degradation, which may include limiting engine output, for example. More specifically, engine operation may be modified so that engine operating conditions under which oil pressure and flow rate are maximum are avoided. Such modification to engine operation may include limiting engine speed (e.g., to speeds below 1500 RPM) for embodiments in which oil pressure and flow rate are a function of engine speed. In some examples, the engine speed limit may vary with oil viscosity such that a higher limit is employed for higher engine speeds (where oil is less viscous) and a relatively lower limit is employed for relatively lower engine speeds (where oil is more viscous). Following 430, routine 400 ends.

If it was determined at 420 that the measured pressure differential is not near the filter bypass valve setpoint (NO), routine 400 proceeds to 432 where it is determined whether the measured pressure differential is substantially greater than the filter bypass valve setpoint. A measured pressure differential may be considered to be substantially greater than the filter bypass valve setpoint if greater than the setpoint by 15% or more, for example. If it is determined that the measured pressure differential is substantially greater than the filter bypass valve setpoint (YES), routine 400 proceeds to 434 where it is determined that the filter bypass valve setpoint is faulted high. A fault in the filter bypass valve setpoint may be considered to correspond to a degraded condition of the filter. This may be followed by various optional actions, including, at 436, warning the vehicle operator of a filter bypass fault. Following 436, routine 400 ends.

If it is determined at 432 that the measured pressure differential is not substantially greater than the filter bypass valve setpoint (NO), routine 400 proceeds to 438 where it is determined that the filter is partially clogged. In some examples, partial clogging may include any level of clogging between fully unclogged (e.g., 0% clogging) and fully clogged (e.g., 100% clogging, in which case oil may be unable to flow through the filter under any operating conditions). In other examples, partial clogging determined at 438 may be less than partial or full clogging that may otherwise have been determined at 424. Partial clogging may be considered to correspond to a degraded condition of the filter. Here, the measured pressure differential is greater than the expected pressure differential but not near or substantially greater than the filter bypass valve setpoint. Various optional actions may follow 438, including, at 440, warning the vehicle operator of partial filter clogging, which in some examples may include providing an estimate of the extent of clogging and/or providing an estimate of the remaining operational life (e.g., in terms of a distance in miles, kilometers) of the filter. Following 440, routine 400 ends.

It will be appreciated that various aspects of routine 400 may be modified without departing from the scope of this disclosure. For example, the oil circuit to which routine 400 is applied may include two or more pressure relief valves upstream of a filter, in which case the condition of the filter may be assessed based on an expected pressure differential across the filter only when oil flows entirely through the filter and does not bypass the filter through any of the pressure relief valves upstream of the filter.

FIG. 5 shows a flowchart illustrating a prognostic routine 500 for a filter in an oil circuit. Routine 500 may be applied to one or both of oil circuits 1 and 1' of FIGS. 1 and 2, respectively, for example. Further, routine 500 may be stored as instructions on computer-readable storage (e.g., memory of controller 12 of FIGS. 1-3) and executed by a processor (e.g., CPU 102 of controller 12). Moreover, routine 500 may be employed to lubrication circuits that circulate lubricants other than oil.

At 502 of routine 500, the remaining operational life of the filter is estimated. The remaining operational life of the filter may be estimated based on, at 504, the difference between the measured pressure differential ($\Delta P$) across the filter and the expected pressure differential across the filter. As described above, the pressure differential across the filter may be measured via a differential pressure sensor such as sensor 14 of FIGS. 1 and 2, while the expected pressure differential may be based on the oil flow rate and viscosity in the oil circuit. In some examples, the remaining operational life may be proportional to the difference between the measured and expected pressure differentials, such that a relatively small difference may lead to an estimation of a relatively short remaining operational life, while a relatively large difference may lead to an estimation of a relatively long remaining operational life. Alternatively or additionally, the remaining operational life of the filter may be estimated based on, at 506, the frequency of filter bypass valve (e.g., valve 22 or 22' of FIGS. 1 and 2, respectively) opening. Opening of the filter bypass valve may be detected via output from a position switch (e.g., switch 16 of FIGS. 1 and 2) coupled to the bypass valve, for example. A relatively higher frequency of filter bypass valve opening may lead to an estimation of a relatively shorter remaining operational life, while a relatively lesser frequency of filter bypass valve opening may lead to an estimation of a relatively longer operational life, for example.

At 508 of routine 500, the remaining operational life of the filter estimated at 502 is indicated to a vehicle operator. The remaining operational life of the filter may be indicated to the vehicle operator in various suitable manners, such as via a dashboard indicator. Alternatively or additionally, the remaining operational life of the filter may be displayed to the vehicle operator, for example via an in-vehicle display, which may be positioned proximate a center console of the vehicle. In some examples, the remaining operational life may be indicated to the vehicle operator in the form of a distance that, when traveled by the vehicle, exhausts the estimated remaining operational life of the filter. At this point, replacement of the filter may be recommended (e.g., due to clogging).

At 510 of routine 500, replacement of the filter may be optionally scheduled based on the remaining operational life of the filter estimated at 502. For example, the replacement may be scheduled in an engine controller (e.g., controller 12 of FIGS. 1-3) in terms of a distance that, when traveled by the vehicle, prompts recommendation of filter replacement, which may be indicated to the vehicle operator. Following 510, routine 500 ends.

Thus, as shown and described, routines 400 and 500, of FIGS. 4 and 5, respectively, may be used to accurately assess the condition of a filter in a lubrication circuit on a significantly granular level. In some particular examples, the remaining operational life of the filter may be determined and optionally indicated to a vehicle operator, enabling excessively early replacement of the filter, which may reduce costs and hazardous waste issues associated with lubricant filter replacement. The diagnostics and/or prognostics described herein may be carried out only during select conditions in which, for example, one or more valves that enable lubricant bypass around a filter are maintained fully closed by limiting an outlet pressure of a pump upstream of the filter and the one or more valves.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine lubricant filter of a vehicle, comprising:
adjusting engine operation and indicating a condition of the engine lubricant filter via a controller based on a difference between a measured pressure differential and an expected pressure differential as determined via the controller, the difference determined only during conditions in which all lubricant pumped by a pump upstream of the engine lubricant filter flows through the engine lubricant filter and does not bypass the engine lubricant filter.

2. The method of claim 1, wherein during the conditions in which all lubricant pumped by the pump flows through the engine lubricant filter and does not bypass the engine lubricant filter, an outlet pressure of the pump is limited via the controller such that one or more valves that enable lubricant bypass around the engine lubricant filter are maintained fully closed.

3. The method of claim 1, where engine operation is adjusted in response to a determination that the engine lubricant filter is clogged as determined via the controller in response to the difference between the measured pressure differential and the expected pressure differential being near a filter bypass value setpoint.

4. The method of claim 1, where adjusting engine operation includes limiting a speed of an engine via the controller.

5. The method of claim 1, further comprising a filter bypass valve for bypassing lubricant around the engine lubricant filter, the filter bypass valve having an actual filter bypass valve setpoint, the controller having a stored filter bypass valve setpoint, and indicating that the actual filter bypass valve setpoint is faulted high via the controller in response to the measured pressure differential being substantially greater than the stored filter bypass valve setpoint.

* * * * *